March 3, 1959     M. ARTZT     2,876,412

MULTI-PHASE POWER REGULATION

Filed July 27, 1955     2 Sheets-Sheet 1

INVENTOR.
*Maurice Artzt*
BY
*J. C. Whittaker*
ATTORNEY

INVENTOR.
Maurice Artzt
BY
J. C. Whittaker
ATTORNEY

United States Patent Office 2,876,412
Patented Mar. 3, 1959

2,876,412

MULTI-PHASE POWER REGULATION

Maurice Artzt, Princeton, N. J., assignor to Radio Corporation of America, a corporation of Delaware Application July 27, 1955, Serial No. 524,642

21 Claims. (Cl. 323—60)

The present invention relates to multi-phase voltage amplitude and phase angle regulation. The invention is particularly applicable to the control of a multi-phase motor which must provide constant output torque.

It is often advantageous and in some cases essential to drive a load with a torque which remains constant regardless of variations in the energy applied to power the drive system. For example, in systems for television recording it is essential that the tape upon which the video information is recorded, or from which the video information is derived, be driven at a high, uniform speed. In one known system of this type which includes a supply reel, a take-up reel and a capstan for driving the tape, the supply reel is braked with a relatively constant braking force and the take-up reel and capstan driven with relatively constant driving forces. It has been found that a slight amount of torque ripple in the output of the capstan drive means, due, for example, to minor changes in the characteristics of the supply voltage applied to the capstan drive means, causes the speed of the tape to vary. Even very minor variations in tape speed produce intolerable distortions in the recorded or reproduced television image. The torque ripple has been found to be due to a major extent to "unbalanced" amplitudes and phases supplied to the motor windings, and to a minor extent to unbalanced windings in the capstan motor itself. If, for example, the drive system includes a three-phase capstan motor driven from a three-phase source, a voltage regulator system which holds all three "line-to-neutral" voltages constant does not eliminate the torque ripple. This is because it does not compensate for changes in phase angle among the three phases. Torque ripple can be substantially completely eliminated, it has been found, only if the regulation system employed compensates for both changes in relative amplitude and/or phase of the three-phase power.

It is an object of the present invention to provide an improved regulation system for a multi-phase power source which maintains the phase and amplitude relationships of the multiple phases constant.

It is another object of the invention to provide an improved arrangement for driving strip material at high, uniform speeds.

It is another object of the present invention to provide for a video tape transport system, an arrangement for driving said tape at constant speed in spite of minor variations in the phases and amplitudes of the voltages applied to drive the capstan motor which drives the tape.

It is yet another object of the present invention to provide an improved motor control system for a three-phase motor.

The present invention is adapted for use, for example, with a source of three-phase power of the type including one neutral terminal and three other terminals. The three other terminals provide voltages displaced in phase from one another predetermined angles (120° when the system is perfectly balanced) and having a predetermined amplitude relationship (equal amplitudes with respect to neutral when the system is balanced). The invention includes circuit means responsive to changes in the relative amplitudes or phase angles of the three voltages for maintaining the relative amplitudes of the three phases the same and for effectively shifting the neutral point of the three-phase source to a value such that, with respect to the shifted neutral point, the predetermined phase relationship among the three voltages is maintained the same. Although described in terms of the three-phase power regulation, the invention is equally applicable to the regulation of the angles and amplitudes of 2, 4, 5 or any higher number of phases.

A typical embodiment of the invention adapted for three-phase power regulation includes a Y impedance network, connected at its three ends to the three-phase conductors of the source, and three variable impedance means, one in series with each leg of the Y. The variable impedance means may comprise electron tube circuits. The center or neutral point of the Y network floats. Any tendency on the part of the angle or amplitude of any phase of the supply voltage to change is compensated for by a corresponding change in the variable impedance means in series with the leg of the Y network associated with that phase. Thus, the voltages across the legs of the Y are maintained at their preset values regardless of changes in the angles or amplitudes of the three phases. However, since the center or neutral point of the Y floats, changes in the source voltage effectively shift this neutral point to a value such that the delta output voltage of the Y network (the voltage output taken from across the three ends of the Y) remains at its preset value. In other words, even though the voltages between the ends of the Y network and "line neutral" (the reference or ground voltage of the three-phase source) may fluctuate, and the angles between the three phases may fluctuate, the delta output voltage of the Y network remains in its preset condition. This output, when initially set to drive a balanced or unbalanced three-phase induction motor without torque ripple continues to drive the motor without torque ripple.

In the more general case where an $n$ phase source of power is to be regulated, $n$ being any integer greater than 1, the impedance network employed has $n$ arms. All arms are connected at one end to a common, floating connection and at their other ends to the respective phase conductors of the source. As in the case of the three-phase regulating system, each leg of the impedance network is connected in series with variable impedance means which regulates the voltage across that leg to a predetermined value.

The invention will be described in greater detail with reference to the following description taken in connection with the accompanying drawing in which.

In the figures similar reference characters identify similar elements.

Figure 1:
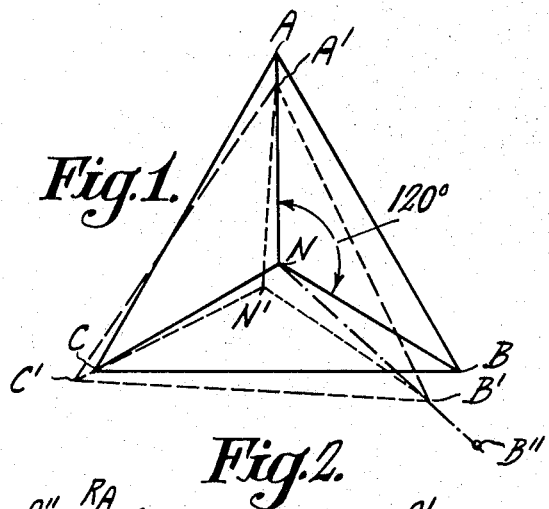
Figure 1 is a diagram employed to describe how the invention operates.

Figure 1 of the drawing shows schematically the voltages present in a perfectly balanced three-phase line. The letter N represents neutral and the three line voltages are NA, NB and NC. It can be seen from the figure that NA=NB=NC and that the three angles to neutral are exactly 120° each. The delta voltages AB, BC and CA are also equal and at equal angles to each other. If these three delta voltages are applied to a delta connected motor, the windings of which are balanced, the motor will have zero torque ripple. This can be proved both mathematically and empirically.

Assume now that there is some change in the balance of the incoming power. This change shifts voltage NB to NB" and the latter differs in both phase angle and amplitude from NB. The new delta voltages supplied to the three-phase motor would now be AB", B"C and CA. If nothing were done to correct this condition, the unbalanced delta voltages would cause torque ripple in the motor.

Now it is shown by Figure 1 that an equilateral triangle A'B'C', congruent to triangle ABC may be fitted onto the new voltage and angle conditions such that one vertex A' lies on the line NA, the second vertex C' lies on the line NC (extended) and the third vertex lies on line NB". Thus, if the voltage NA is regulated to a new value NA', and NB" regulated to NB', and NC regulated to NC', the output delta voltage again will be balanced even though the Y voltages to the line "neutral" are now different in both value and angle from their perfectly balanced condition. The effect of the above type of voltage regulation is effectively to shift the neutral point N of the system to a new point N'. The shifted neutral point N' of delta A'B'C' will correspond to line neutral point N only when the power line angles remain fixed at 120°, whereby only amplitude regulation is required.

Figure 2:
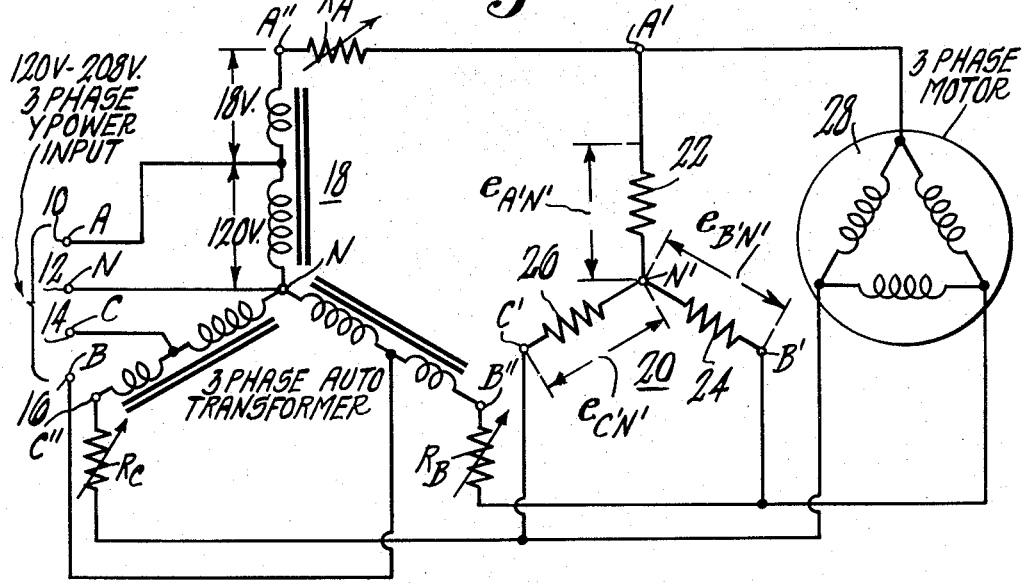
Figure 2 is a schematic circuit diagram of a typical embodiment of the invention.

Referring to Fig. 2, the Y connected source of three-phase power (not shown) is adapted to be connected to terminals 10, 12, 14 and 16 of the regulating circuit. The power source may be a conventional 120–208 volt system. Three-phase auto transformer 18 is connected to the input terminals in the manner shown. Each leg of the transformer consists of two sections such that the output voltages A"N, B"N and C"N of the transformer are somewhat greater than the input voltages thereto. Thus, in the form of the invention illustrated, the input voltages are 120 volts when the system is balanced, whereas the output voltages are 138 volts under the same conditions.

Y connected impedance network 20 is connected across the three-phase transformer. The network is shown as including resistors 22, 24, and 26 respectively, however, it is to be understood that inductive or capacitative elements may be substituted for the resistors. In a preferred form of the invention impedances 22, 24, and 26 whether resistors, coils or capacitors are of the same value, however, the invention is not limited to the use of equal impedances. The center N' of the impedance network is left floating. Connected in series between the respective legs of the impedance network and corresponding legs of the three-phase autotransformer are regulating impedance means $R_A$, and $R_B$ and $R_C$. These are shown schematically in Figure 2 as variable resistor elements and act as such elements, however, as will be explained more fully below, they include transformers, tube circuits, etc. The delta voltage output of network 20 is supplied to three-phase load 28, which, in one form of the invention, comprises a three-phase delta induction motor.

The regulating system of the arrangement of Figure 2 functions to maintain the voltage $e_{A'N'}$, $e_{B'N'}$ and $e_{C'N'}$ at the values to which they are originally set. The manner in which the voltages may be originally set will be explained in greater detail later in connection with Figure 3. If voltages $e_{A'N'}$, $e_{B'N'}$ and $e_{C'N'}$ are preset to the same value and resistors 22, 24, and 26 are of the same value the network provides a perfectly balanced delta output regardless of changes in relative phase angle or amplitude among the three phases of the input voltage to the network. If, on the other hand, the voltages across resistors 22, 24 and 26 are preset to different values and the resistors are of the same value, the delta output of the network will be unbalanced. This unbalanced delta output will also be maintained at its preset value regardless of changes in relative phase angle or amplitude among the three phases of the input voltage to the system.

Figure 3:
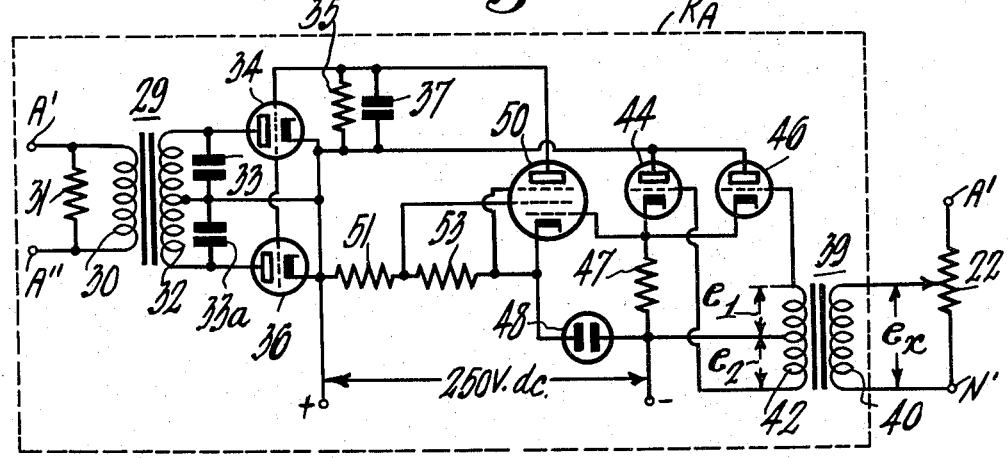
Figure 3 is a schematic circuit diagram showing in more detail a portion of the circuit of Figure 2; and, Figure 4 is a block diagram showing a complete system in which the present invention may be employed.

The regulating impedance means $R_A$, $R_B$ and $R_C$ are identical and only one ($R_A$) is shown in detail in Figure 3. It includes a transformer 29, the primary winding 30 of which is connected in series between points A' and A" of the circuit of Figure 2. This primary winding is loaded with a resistor 31 of fixed value. Secondary winding 32 of the transformer is loaded by a pair of capacitors 33, 33a and a pair of triodes 34, 36. The anodes of the triodes are connected to the opposite ends of the secondary winding. The control grids of the triodes are biased with respect to their cathodes by the network including resistor 35 and capacitor 37. The greater the bias, the less current drawn by the triodes and the greater the effective impedance of the secondary winding; the smaller the bias, the more current drawn by the triodes and the smaller the effective impedance of the secondary winding. Since the impedance reflected to the primary winding is a function of the effective impedance of the secondary winding, it is also a function of the triode biasing voltage.

Transformer 39 includes a primary winding 40 connected across at least a portion of resistor 22 and a secondary winding 42. The opposite ends of the secondary winding are connected to the respective control grids of triodes 44, 46. The cathodes of the triodes are connected to a common load resistor 47. The triodes thus act as a full-wave, cathode-follower type-rectifier which presents a high impedance to transformer 39 and therefore loads resistor 22 to an insignificant extent.

Voltage regulator tube 48 normally maintains pentode 50 well below cutoff. In a practical circuit, a VR105 was chosen for the regulator tube and a 250 volt direct voltage, of the polarity indicated, applied across the network including resistors 51, 53 and the tube. The tube thereby maintains the cathode of the pentode 105 volts positive with respect to its control grid. The voltage developed across resistor 47 due to the current output of the full-wave rectifier is in a sense to oppose this biasing voltage. When the peaks of the voltage rectified by the full-wave rectifier and applied across resistor 47 reach approximately 102 volts, the bias on pentode 50 is overcome. When the peaks of the voltage applied to the rectifier exceed approximately 102 volts, the pentode draws pulses of plate current and these are stored by capacitor 37. The capacitor discharges through resistor 35 in the proper sense to increase the bias on triodes 34, 36.

In operation, assume that the voltage $e_x$ taken from across resistor 22 is such that the quiescent bias applied to triodes 34, 36, is somewhere between its lowest value (tube 50 cutoff) and its highest value (tube 50 conducting most heavily). If the voltage NA" (Fig. 2) increases, voltage $e_x$ also tends to increase. Voltages $e_1$, $e_2$ across secondary winding 42 also tend to increase whereby the voltage applied across resistor 47 by rectifier 44, 46 also tends to increase. The effect is to decrease the bias on the pentode whereby it conducts more heavily. This increases the bias voltage developed across resistor 35 and triodes 34 and 36 draw less current. The impedance presented by transformer 29 thereby increases. Summarizing, the tendency of voltage $e_x$ to increase is compensated for by a corresponding increase in the impedance of $R_A$ (Fig. 2) whereby voltage $e_x$ and also $e_{A'N'}$ is maintained constant. Voltages $e_{B'N'}$ and $e_{C'N'}$ are regulated in exactly the same manner.

Varying the tapping point along resistor 20 varies the output voltage of phase A (the voltage across resistor 22). In a similar manner the taps (not shown) on resistors 24 and 26 (Fig. 2) provide means for regulating the output voltages of phases B and C respectively.

If the three-phase motor 28 driven by the regulating system described above is perfectly balanced, the A, B and C phases of the voltage applied to the motor are initially adjusted to be in balance both with respect to phase angle and amplitude. In such case, the delta output voltage of network 20 is perfectly balanced and remains balanced in spite of changes in the relative phase angles or amplitudes of the voltage applied to terminals 12, 14 and 16. However, it has been found that very few motors of this type are perfectly balanced. If the motor is not perfectly balanced and the voltage supply to the motor is balanced, there will be a small amount of torque ripple at the output of the motor. This can be completely eliminated by slight adjustment of the delta voltages applied to the motor in the manner described in the immediately preceding paragraph. When the regulating system is originally set to eliminate torque ripple from the motor, the system continuously regulates the voltages applied to the motor to their preset relative amplitudes and phase angles and the motor continues to run without torque ripple.

Figure 4:
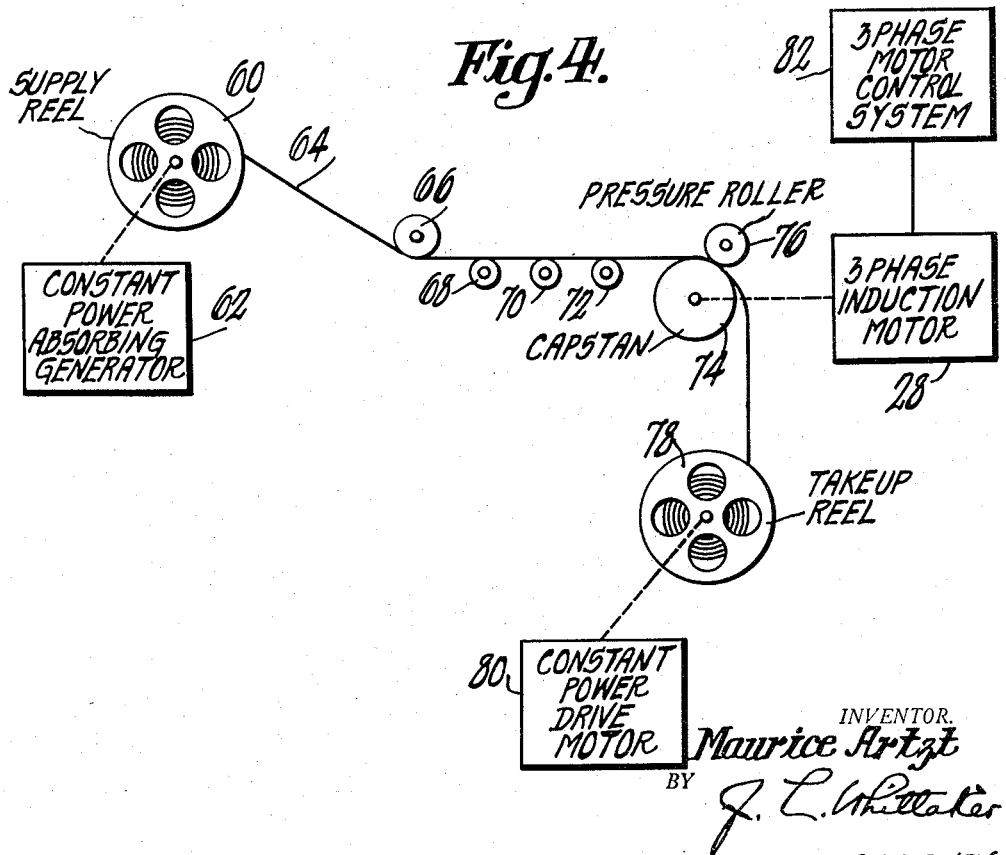

In a practical embodiment of the invention, it has been found possible to obtain a regulated output voltage range of from 109 to 131 volts output for the 138 volt input per phase shown. The current supplied to the motor was about 0.7 ampere per phase. In this practical embodiment of the invention the following circuit components were employed:

Triodes 34, 36—type 6AS7
Pentode 50—type 6SH7
Triodes 44, 46—type 6SL7
Capacitors 33 and 33a—0.1 microfarad
Resistor 31—75 ohms
Transformer 29—United Transformer Co., Type LS55
Resistors 22, 24 and 26—10,000 ohms each Fig. 4 illustrates a video tape transport system in which the present invention may be employed. A constant tension is maintained on supply reel 60 by a constant power absorbing generator 62. The latter may be of the type described in Patent No. 2,024,708, dated September 17, 1935, titled "Electron Tube Type Tension Regulator." Tape 64, passes over pulley 66, erase head 68, recording head 70 and play-back head 72. The tape is driven by capstan 74, which in turn is driven by three-phase motor 28. Pressure roller 76 which is normally biased by a spring or the like (not shown) maintains tape 64 in constant engagement with the capstan. Take-up reel 78 is driven in such manner that the tension on tape 64 remains fairly constant. The drive means may be a constant power output drive motor 80, such as described in Patent No. 2,512,944, dated June 27, 1950, titled "Direct Current Motor Control."

It has been found that a system of the type described above maintains the tape speed constant to a relatively high degree, however, there are still some minor variations in tape speed. These are undesirable since they cause distortion and loss of picture synchronization. It has been found that such minor speed variations may be substantialy completely eliminated if the torque ripple in the mechanical output of the three-phase induction capstan motor 12 is eliminated. The voltage regulating system 82 of the present invention, which regulates the supply voltages to the capstan motor, permits motor operation entirely free of torque ripple.

It is to be understood that although in the detailed discussion above specific values are assigned to various voltages and circuit components, these are meant to be illustrative of the invention and not limiting thereof.

What is claimed is:

1. In combination, four connections for a source of three-phase power including one neutral connection and three other connections, said three other connections providing voltages of substantially equal amplitude with respect to a neutral point and displaced in phase from one another substantially 120°; and circuit means responsive to changes in the relative phase angles of individual ones of said three voltages for maintaining the amplitudes of said voltages substantially equal and effectively shifting said neutral point to a value such that, with respect to said shift neutral point, said three voltages remain displaced in phase from one another substantially 120°.

2. In combination, four connections for a source of three-phase power including one neutral connection and three other connections, said three other connections providing input voltages displaced in phase from one another predetermined angles and having a predetermined amplitude relationship; a Y impedance network coupled at the three ends thereof to said three other connections, the center of said Y floating with respect to said neutral point; and means in circuit with said Y impedance network for regulating the voltages across the three legs thereof to predetermined values.

3. In the combination as set forth in claim 2, the legs of said Y impedance network including resistor elements.

4. In combination, connections for a source of $n$ phase power including 1 neutral connection and $n$ other connections, said $n$ other connections providing input voltages displaced in phase from one another predetermined angles, where $n$ is any integer greater than 1; and circuit means responsive to changes in the relative amplitudes of individual ones of said input voltages for maintaining said adjusted voltages in a predetermined amplitude relationship and effectively shifting the electrical neutral point of said adjusted voltages to a value such that, with respect to said shifted neutral point, said voltages are maintained in a predetermined phase relationship.

5. In combination, four connections for a source of three-phase power including one neutral connection and three other connections, and 3 other connections providing input voltages displaced in phase from one another predetermined angles; means for individually adjusting said voltages to have a predetermined amplitude and phase relationship; and circuit means, including three like impedance elements connected at one end to a common point which floats with respect to said neutral connection, responsive to changes in one of the relative amplitude and phase angle of any one of said three input voltages for maintaining said adjusted voltages in their predetermined amplitude relationship and effectively shifting the electrical neutral point of said adjusted voltages to a value such that, with respect to said shifted neutral point, the predetermined phase relationship among them is maintained the same.

6. In combination, four connections for a source of three-phase power including one neutral connection and three other connections, said three other connections providing input voltages displaced in phase from one another predetermined angles; means for individually adjusting said voltages to have a predetermined amplitude and phase relationship; and circuit means, including three like impedance elements of equal value connected at one end to a common point which floats with respect to said neutral connection, responsive to changes in one of the relative amplitude and phase angle of any one of said three input voltages for maintaining said adjusted voltages in their predetermined amplitude relationship and effectively shifting the electrical neutral point of said adjusted voltages, to a value such that, with respect to said shifted neutral point, the predetermined phase relationship among them is maintained the same.

7. In combination, four connections for a source of three-phase power including one neutral connection and three other connections, said three other connections providing input voltages displaced in phase from one another predetermined angles; means for individually adjusting said voltages to have a predetermined amplitude and phase relationship; and circuit means, including three resistors of equal value connected at one end to a common point which floats with respect to said neutral connection, responsive to changes in one of the relative amplitude and phase angle of any one of said three input voltages for maintaining said adjusted voltages in their predetermined amplitude relationship and effectively shifting the electrical neutral point of said adjusted voltages to a value such that, with respect to said shifted neutral point, the predetermined phase relationship among them is maintained the same.

8. In combination, four connections for a source of three-phase power including one neutral connection and three other connections, said three other connections providing voltages of equal amplitude with respect to a neutral point and displaced in phase from one another 120°; and circuit means responsive to changes in one of the relative amplitude and phase angle of any one of said three voltages for maintaining the amplitudes of said voltages equal and effectively shifting said neutral point to a value such that, with respect to said shifted neutral point, said three voltages remain displaced in phase from one another 120°, said circuit means including a Y impedance network, the three legs of the Y consisting of resistors of equal value, and the center point of said Y floating with respect to said neutral connection.

9. In combination, four connections for a source of three-phase power including one neutral connection and three other connections, said three other connections providing input voltages displaced in phase from one another predetermined angles and having a predetermined amplitude relationship; a Y impedance network coupled at the three ends thereof to said three other connections, the center of said Y floating with respect to said neutral point; means in circuit with said Y impendance network for regulating the voltages across the three legs thereof to predetermined values; and means for adjusting the relative value of at least the voltage across one leg of said Y impedance network.

10. In combination, four connections for a source of three-phase power including one neutral connection and three other connections, said three other connections providing input voltages displaced in phase from one another predetermined angles and having a predetermined amplitude relationship; a Y impedance network coupled at the three ends thereof to said three other connections, the center of said Y floating with respect to said neutral point; means in circuit with said Y impedance network for regulating the voltages across the three legs thereof to predetermined values; and means in circuit with said Y impedance network for adjusting the relative values of the voltages across the respective legs of said Y impedance network.

11. In combination, four connections for a source of three-phase power including one neutral connection and three other connections, said three other connections providing input voltages displaced in phase from one another predetermined angles and having a predetermined amplitude relationship; a Y impedance network coupled at the three ends thereof to said three other connections, the center of said Y floating with respect to said neutral point; and means in circuit with said Y impedance network for regulating the voltages across the three legs thereof to predetermined values, said Y impedance network consisting of three impedance legs of equal value.

12. In combination, four connections for a source of three-phase power including one neutral connection and three other connections, said three other connections providing input voltages displaced in phase from one another predetermined angles and having a predetermined amplitude relationship; a Y impedance network coupled at the three ends thereof to said three other connections, the center of said Y floating with respect to said neutral point; means in circuit with said Y impedance network for regulating the voltages across the three legs thereof to predetermined values; and a three-phase motor connected to be driven by the delta output voltage of said Y impedance network.

13. In combination, four connections for a source of three-phase power including one neutral connection and three other connections, said three other connections providing input voltages displaced in phase from one another predetermined angles and having a predetermined amplitude relationship; a Y impedance network coupled at the three ends thereof to said three other connections, the center of said Y floating with respect to said neutral point; means in circuit with said Y impedance network for regulating the voltages across the three legs thereof to predetermined values; an unbalanced three-phase motor connected to be driven by the delta output voltage of said Y impedance network; and means in circuit with said Y impedance network for adjusting the delta output voltage thereof to be unbalanced in a sense to compensate for the unbalance of said three-phase motor.

14. In combination, connections for a source of N phase power, where N is any integer greater than 1, including one neutral connection and N other connections, said N connections being adapted to provide voltages displaced in phase from one another predetermined angles; an electronically controllable impedance means in series with each connection; and electronic means responsive to the tendency of an individual one of said voltages to change for regulating the controllable impedance means in series with the connection providing that voltage, for adjusting said impedance means to compensate for said change.

15. In combination, connections for a source of N phase power, where N is any integer greater than 1, including one neutral connection and N other connections, said N connections being adapted to provide voltages displaced in phase from one another predetermined angles; a controllable impedance means in series with each connection; and N means, each responsive to the tendency of a different one of said voltages to change, for respectively regulating the controllable impedance means in series with the connection providing that voltage for adjusting said impedance means to compensate for said change.

16. In combination, connections for a source of N phase power, where N is any integer greater than 1, including one neutral connection and N other connections, said N connections being adapted to provide voltages displaced in phase from one another predetermined angles; a controllable impedance means in series with each connection; and an impedance network comprising N like impedance elements, connected at one end to a common floating connection, and at the other end to the respective ones of said connections; and means for sensing the voltage across a portion of one of said impedance elements and responsive to the tendency of said voltage to change for regulating the controllable impedance means in series with the connection providing that voltage, for adjusting said impedance means to compensate for said change.

17. In combination, connections for a source of N phase power, where N is any integer greater than 1, including one neutral connection and N other connections, said N connections being adapted to provide voltages displaced in phase from one another predetermined angles; a controllable impedance means in series with each connection; and an impedance network comprising N like resistor elements connected at one end to a common floating connection, and at the other end to the respective ones of said connections; and means for sensing the voltage across a portion of one of said resistor elements and responsive to the tendency of said voltage to change for regulating the controllable impedance means in series with the connection providing that voltage, for adjusting said impedance means to compensate for said change.

18. In combination, connections for a source of N phase power, where N is any integer greater than 1, including one neutral connection and N other connections, said N connections being adapted to provide voltages displaced in phase from one another predetermined angles; N controllable impedance means, each comprising a transformer having two coupled windings, each transformer having one winding connected in series with one of said connections, respectively; and means responsive to the tendency of an individual one of said voltages to change for applying a voltage across the other winding of the transformer associated with the connection providing that voltage, for adjusting the impedance presented by its one winding in the correct sense to compensate for said change.

19. In combination, connections for a source of $n$ phase power including one neutral connection and $n$ other connections, said $n$ other connections providing input voltages displaced in phase from one another predetermined angles, where $n$ is an integer greater than 1; $n$ voltage sensing means, each for sensing the tendency of a different one of said input voltages to change, and each responsive to such tendency for producing an error voltage; $n$ error voltage controllable impedance means, each in circuit with a different one of said $n$ connections; and $n$ circuit means, each for applying an error voltage to the impedance means in circuit with the connection from which said error voltage is derived, and in a sense to adjust said impedance means to compensate for the tendency of its input voltage to change.

20. In combination, connections for a source of $n$ phase power including one neutral connection and $n$ other connections, said $n$ other connections providing input voltages displaced in phase from one another predetermined angles, where $n$ is an integer greater than 1; $n$ connections for a load to which it is desired to deliver voltages of constant magnitude and phase; and $n$ circuit means, each in circuit with a source connection and a load connection respectively, each said circuit means comprising means for sensing the tendency of the amplitude of the input voltage associated with that circuit to change for deriving therefrom an error voltage, and a controllable impedance responsive to said error voltage for regulating said input voltage to a predetermined amplitude.

21. In combination, connections for a source of $n$ phase power including one neutral connection and $n$ other connections, said $n$ other connections providing input voltages displaced in phase from one another predetermined angles, where $n$ is an integer greater than 1; $n$ connections for a load to which it is desired to deliver voltages of constant magnitude and phase; and $n$ circuit means, each in circuit with a source connection and a load connection respectively, each said circuit means comprising means for sensing the tendency of the amplitude of the input voltage associated with that circuit to change for deriving therefrom an error voltage, and a controllable impedance responsive to said error voltage for regulating said input voltage to a predetermined amplitude relative to a voltage reference point which floats with respect to ground, said reference point being the same for the $n$ voltages applied to said connections for a load.

References Cited in the file of this patent
UNITED STATES PATENTS

| | | |
|---|---|---|
| 1,280,624 | Alexanderson | Oct. 8, 1918 |
| 1,551,270 | Slepian | Aug. 25, 1925 |
| 1,658,948 | Slepian | Feb. 14, 1928 |
| 1,672,897 | Mayer | June 12, 1928 |
| 1,719,889 | Kelsey | July 9, 1929 |
| 1,810,596 | Champlin | June 16, 1931 |
| 2,365,691 | Fodor | Dec. 26, 1944 |
| 2,474,620 | Fath | June 28, 1949 |
| 2,561,080 | Van De Weil | July 17, 1951 |
| 2,632,862 | Stoltz | Mar. 24, 1953 |
| 2,665,407 | Elliot | Jan. 5, 1954 |
| 2,670,906 | Daniels et al. | Mar. 2, 1954 |
| 2,728,884 | Pestarini | Dec. 27, 1955 |

UNITED STATES PATENT OFFICE
Certificate of Correction

Patent No. 2,876,412

March 3, 1959

Maurice Artzt

It is hereby certified that error appears in the printed specification of the above numbered patent requiring correction and that the said Letters Patent should read as corrected below.

Column 5, line 62, for "substantialy" read —substantially—; column 6, line 8, for "shift" read —shifted—; line 27, for "where in" read —where $n$—; line 37, for "and 3" read —said three—.

Signed and sealed this 14th day of July 1959.

[SEAL]

Attest:
KARL H. AXLINE,
*Attesting Officer.*

ROBERT C. WATSON,
*Commissioner of Patents.*